United States Patent [19]
Kaneko

[11] Patent Number: 4,907,192
[45] Date of Patent: Mar. 6, 1990

[54] MICROPROGRAM CONTROL UNIT HAVING MULTIWAY BRANCH

[75] Inventor: Hiroaki Kaneko, Tokyo, Japan
[73] Assignee: NEC Corporation, Tokyo, Japan
[21] Appl. No.: 928,421
[22] Filed: Nov. 10, 1986

[30] Foreign Application Priority Data

Nov. 8, 1985 [JP] Japan .................................. 60-250055
Nov. 8, 1985 [JP] Japan .................................. 60-250059

[51] Int. Cl.[4] .......................... G06F 9/20; G06F 9/22; G06F 9/38
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 4,130,869 | 12/1978 | Kinoshita et al. | 364/200 |
| 4,131,835 | 12/1978 | Lange | 364/200 |
| 4,151,597 | 4/1979 | Nguyen Huu et al. | 364/200 |
| 4,160,289 | 7/1979 | Bambara et al. | 364/200 |
| 4,179,737 | 12/1979 | Kim | 364/200 |
| 4,323,964 | 4/1982 | Gruner | 364/200 |
| 4,338,661 | 7/1982 | Tredennick et al. | 364/200 |
| 4,373,180 | 2/1983 | Linde | 364/200 |
| 4,430,711 | 2/1984 | Anderson et al. | 364/200 |
| 4,446,518 | 5/1984 | Casamatta | 364/200 |

Primary Examiner—Archie E. Williams, Jr.
Assistant Examiner—Ayni Mohamed
Attorney, Agent, or Firm—Foley & Lardner, Schwartz, Jeffery, Schwaab, Mack, Blumenthal & Evans

[57] ABSTRACT

A microprogram control unit is provided for processing conditional branch micro-instructions stored in a micro-instruction memory to control the function of an information processing apparatus. The unit includes a microprogram counter coupled to the micro-instruction memory and contains an address for accessing the micro-instruction stored in the memory. A circuit is provided for registering the micro-instruction received from the micro-instruction memory and having an address field coupled to the microprogram counter and a condition field for designating a condition to be judged. A detecting circuit is coupled to the registering circuits to receive the micro-instruction therefrom and for detecting the conditional branch micro-instruction. Further, there is provided a circuit for generating status signals representing respectively a plurality of the status of the information processing apparatus and selectively outputting anyone of the status signals. There is also provided a circuit for judging the coincidence between the status signal selectively outputted from the status signal generating circuit and the condition designated by the content of the condition field of the micro-instruction registered by the registering circuit to output a branch control signal. With this arrangement, the address field of the micro-program counter may be replaced by the content of the address field of the micro-instruction in accordance with the branch control signal.

11 Claims, 9 Drawing Sheets

[PRIOR ART]

(a) number of numerical digits is odd (b) number of numerical digits is even

MICROPROGRAM CONTROL UNIT HAVING MULTIWAY BRANCH

FIELD OF THE INVENTION

The present invention relates to a microprogram control unit, and more particularly to a microprogram control unit used for branch control of the microprogram.

DESCRIPTION OF THE PRIOR ART

In the information processing apparatus of the prior art adopting a microprogram control method with a program counter, the change of control sequence is executed by the micro-instruction called "branch micro-instruction". The branch micro-instruction aims to replace all or a part of the present content of the program counter by the content of the address field which the branch micro-instruction contains an operand.

Here, the micro-instruction with a conditioned field as the other operand is called a conditional micro-instruction, and the conditional micro-instruction executes a branch operation only where the indicated condition coincides with the present status within the information processing device.

FIG. 1 is a block diagram of the microprogram control unit. Micro-instruction register 103 latches the content of micro-instruction memory 102 storing the micro-instruction which is accessed by micro-program counter 101. When the micro-instruction being latched in the micro-instruction register 103 is detected to be a conditional branch micro-instruction, a detection signal CBRANCH is generated by a decoder 104.

In this prior example, the conditional micro-instruction has a format as shown in FIG. 2 (a), in which COND is the condition field with C-bit length, which indicates the condition to be checked. ADRS is the address field with a-bit length, which includes the information related to address control. Condition selector 105 selects a status signal STATE m among $2^C$ kinds if status signals STATE m (m is 0 to $2^C$) which are generated within the information processing device. Branch control signal generating circuit 106 receives the selected status signal from the selector 105 and the detection signal from the decoder 104 to generate a branch control signal BRANCH if the selected status signal STATE n is true.

The low order address of microprogram counter 101 is replaced with the content of the address field ADRS of the branch micro-instruction, while the content of the microprogram counter 101 is ordinarily incremented by one if the selected status signal is true.

Assuming that the present content of microprogram counter 101 is M, if the conditional control signal BRANCH is false the content of the micro-program counter 101 is renewed to M+1 at the end of the execution of the micro-instruction latched in micro-instruction register 103. On the contrary, if the conditional control signal BRANCH is true, the content of the microprogram counter 101 becomes int (M/2 a*- 2 a)+x at the end of the execution of the micro-instruction, so that the branch operation is executed.

One of the performances required for the branch micro-instruction is that the scope of the controllable address is sufficiently large to describe the microprogram. In other words, it means that the bit-width a of address field ADRS is large. Also, it is required as the other one of the branch micro-instruction's functions that larger number of conditions may be checked. The latter means that the bit-width c of the condition field COND is sufficiently large.

Furthermore, in the in micro-instructions of a fixed word length, it is impossible that (a+c), the sum of the length of address field ADRS and that of condition field COND, surpasses the word length of the micro-instruction. Therefore, either the controllable address field or the detectable condition number would be restricted in the real conditional branch micro-instruction.

FIGS. 2 (b) and (c) show, respectively, the format of the conditional branch micro-instruction other than the conditional branch micro-instruction as described above. Particularly in the microprogram to realize more complex functions, it follows that the limitation is imposed upon the number of detectable conditions, because the bulk of the program increases. As above described, in the conditional micro-instruction instruction having fired c-bit length for the condition field COND the, detectable condition number is limited up to $2^c$. Among conditions to be checked, there are ones to be referred frequently, and on the contrary there are ones to be referred only to one timing during the execution of the whole microprogram. Accordingly, it is meaningless to give a possibility of $\frac{1}{2}^c$ to these conditions of different reference frequency.

Under the situation such as described above, it is required that the condition to be selected be the least requirements, that is, the greatest common divisor for the whole microprogram. For example, consider the case that the large/small relation of binary numbers is judged by the flags in the processor status words (hereinafter called PSW), which inform the program of the present situation of the information processing apparatus. In this case, it is presumed that there are a sign flag (hereinafter called SF), a zero flag (hereinafter called ZF), an overflow flag (hereinafter called OF), and a carry flag (hereinafter called CF), and that as the result of the operation each flag respectively changes as follows.

| | |
|---|---|
| SF | content of the most significant bit (sign flag) of operation's result |
| ZF | being set if operation's result is zero, and being cleared if not |
| OF | in the operation being set if the digit overflow (carry) into the most significant bit arises or borrowing from the most significant bit (borrow) arises, and being cleared if not |
| CF | in the operation, being set if the digit overflow from the most significant bit arises or borrowing into the most significant bit (borrow) arises, and being cleared if not |

Although the large/small relation of the two binary numbers is detectable by means of the above operation-related flag's values, which have changed by substraction, these respective flags' meaning depends upon whether binary numbers are signed or not.

In other words, there are the following kinds of large/small relation of the two signal binary numbers (the relation is indicated by abbreviation and also indicated by the symbol in the parenthesis).

| | | |
|---|---|---|
| greater | GT | (>) |
| greater or equal | GE | (≧) |
| equal | EQ | (=) |
| smaller or equal | LE | (≦) |

-continued

| smaller | LT | (<) |
|---|---|---|
| not equal | NE | (≠) |

Also, there are the following kinds of large/small relations of the two unsigned binary numbers (the relation is indicated by abbreviation and also indicated by symbol in the parenthesis).

| larger | A | (>) |
|---|---|---|
| larger or equal | AE | (≧) |
| equal | EQ | (=) |
| smaller or equal | BE | (≦) |
| smaller | B | (<) |
| not equal | NE | (≠) |

Furthermore, because the above relations are related with the flags SF, ZF, OF and CF, the above relations can be described as follows:

GT ... ((SF eor OF) or ZF)=0
GE ... (SF eor OF)=0
EQ ... ZF=1
LE ... ((SF eor OF) or ZF)=1
LT ... (SF eor OF)=1
NE ... ZF=0
A ... (CF or ZF)=0
AE ... CF=0
BE ... (CF or ZF)=1
B ... CF=1
P (plus) ... SF=0
M (minus) ... SF=1
No (non overflow) ... OF=0
O (overflow) ... OF=1

Therefore, it is required that at least 14 kinds of conditions are selectable in order that all of the above large/small relations of signed or unsigned binary numbers may be checked. Also, the kinds of selection can be decreased up to 8 if the selection base upon true/false is added to the selected conditions.

The greatest common divisor of conditions to be checked are four kinds of flag conditions such as SF, ZF, OF, and CF. Assuming that all of the above situations are checked by basing upon only conditional branch micro-instruction related to these conditions, it follows that checking itself is impossible but for making use of the plural branch micro-instructions according to the kinds of situations, and accordingly that each execution period of condition varies from each other.

In general, the execution of the branch micro-instruction frequently courses a drop in execution effectivity of micro-program, because, in the case of microprogram control method, the execution time is consumed more in executing branch micro-instruction then in doing no branch or a sequential program.

For example, the following is the description as for the case that, often checking GT, the process branches to PROC-GT if the relation is "greater" and the PROC-NGT if not greater. Here, the if-sentence describes the conditional branch micro-instructions, and the goto-sentence describes the branch micro-instructions. Also, each instruction becomes able to be executed during T cycles where no branch arises. But it is executed during 2T cycles where any branch arises.

if ZF=1 then goto PROC-NGT;
if SF=1 then goto TEMP;
if OF=0 then goto PROC-NGT;
goto PROC-NGT TEMP:
if OF=1 then goto PROC-GT;
PROC-NGT:

In the above case, it follows that the fire words of micro-instruction memory are consumed and furthermore execution period of 2T cycles to 5 cycles are necessary.

As above described, in order to check plural complex situations, plural selection conditions are necessary. Otherwise longer execution periods are necessary for plural micro-instructions.

In an information processing apparatus by a microprogram control method using a conventional program counter, micro-instructions called branch micro-instructions are used so as to change the sequence of control. The branch micro-instruction changes the sequence of control by replacing a portion or all of the present content of the micro-program counter by the content of the branch address field which the branch micro-instruction has as an operand. A branch micro-instruction which has a condition field as other operands is called a conditional branch micro-instruction. Such a conditional branch micro-instruction executes a branch operation only if the designated condition corresponds to the present states inside the information processing apparatus.

FIG. 3 shows a block diagram of a conventional microprogram control unit of another type. A register file 210 and an arithmetic logical unit 207 are coupled to a data bus 206. Arithmetic and logical operation can be executed with respect to the data stored in the register file 210.

A microprogram stored in a micro-instruction memory 201 is accessed by the address designated by an address register 200. Once the corresponding micro-instruction is latched by an instruction latch means 202, the above instruction is decoded by an instruction decoder 204 and thereby a micro-instruction is generated with respect to the control point inside the information processing apparatus. Thus, after the conditional branch micro instruction is detected by the instruction decoder 204, the micro order MJMP is generated. After the MJMP is detected, the content of the condition field MOOND of the branch micro-instructions is compared with a status signal STATUS showing the status of the ALU 207. With such a comparison, it is judged whether the branch condition is satisfied, and a branch control signal LDJMP is generated if the condition is satisfied.

In case that the LDJMP signal is inactive, the above address register 200 loads the content of an incrementor 203 which advances the content MA of the address register 200 by one step, and thereby the address content is incremented and the micro-instruction is sequentially accessed. On the contrary, in case that the LDJMP signal is generated, a branch operation is executed by loading the output of a branch address generator 209, which generates a branch address designated by the address field of the branch micro-instruction, to the address register 200.

Such a branch operation that changes the branch address according to a single parameter changing on the way of executing the microprogram is called a multi-way branch function.

Suppose an applied example where the parameter N can change from 0 to n, and where the procedure 0 which is an assembly of micro-instructions is executed if the parameter N is 0, the procedure 1 is executed if N is 1 and similarly the procedure n is executed if N is n.

In the information processing apparatus with the conventional microprogram control unit, the following plurality of micro-instructions need to be executed so as to realize the above multiway branch function.

(1) Judging whether N is 0.
(2) Branching to the procedure 0 if N is 0.
(3) Calculating N−1.
(4) Branching to the procedure 1 if the result of the above calculation N−1 is 0.
(5) Calculating N−n.
(6) Branching to the procedure n if the result of the above calculation N−n is 0.

In the above procedure, the ALU 207 is used in the steps (1), (3) and (5) because the substraction operation has to be done. On the other hand, in the steps (2), (4) and (6), a conditional branch micro-instruction with condition is used so as to judge whether the result of the calculation by ALU 207 is zero.

In case that the parameter N goes beyond n, the following additional steps need to be executed in order to detect the above N as an incorrect value.

(7) Calculating N−n.
(8) Branching to the procedure for error processing if the result of the calculation N−n is positive.

As above described, the operation micro-instructions are as many as at least procedures, and conditional branch micro instructions are used in order to change the procedure to be executed according to the value of the parameter. There exists a defect that the capacity of the microprogram is increased and the mean time necessary to branch to each procedure is increased.

Moreover, there exists another defect that it is necessary to occupy the hardware relating to the data operation such as the register file 210, the data bus 206 and the ALU 207 although the branch function should be essentially realized.

In a processing where it is necessary to change the procedure to be executed according to the value of the parameter, the execution function of the procedure is designated as a command or status. Therefore, however, shown here is the example such as sign processing in the arithmetical operation of binary coded decimal (BCD) numbers.

Binary coded decimal (BCD) notation is a kind of numerical value notation system where the decimal numbers 0 to 9 are converted to the binary numbers with four bits 0000 to 1001. Each four bits is called a digit, and two digits of the BCD are stored in one bite (8 bits). Such a packed BCD can be descriminated from such as an unpacked BCD that one digit of the BCD is stored in each one bite data.

FIG. 4 shows a general format of the unpacked BCD. The upper digit of the bits data Bn (in case the length of the digit which expresses a numerical value is odd) 400 including the most significant digit (MSD) or of the subsequent bite data Bn+1 (in case that the length of digit which expresses a numerical value is even) 401 to the bite data Bn including the MSD, designates whether the expressed decimal nember is positive or negative by means of the digit which expresses each numerical value as the sign digit. The digits excluding the sign digit are called numerical digits.

A sign digit expresses the sign of a decimal number according to the value of the sign digit. The value used most frequently are, however, are the incorrect values such as 1010 to 1111. The typical example illustrating the corresponding relationship between the content of the sign digit and the sign thereof is shown hereinafter.

| sign digit | sign |
| --- | --- |
| 1010 | positive |
| 1011 | negative |
| 1100 | positive |
| 1101 | negative |
| 1110 | positive |
| 1111 | positive |

According to the principle of the above coding system, the sign is positive if the value of the least significant bit (LSB) of the sign digit is 0, and the sign is negative if the value of LSB is 1. The sign is exceptionally positive if the sign digit is 1111.

In case that the sign digit is the value excluding the listed values, such as the values 0000 to 1001 (these values are in the correct region as numerical values, and the correct region and incorrect region excludes each other), it is necessary to detect the error in the expression method as the whole decimal numbers.

The process is branched respectively into the procedure "proc-plus" dealing with the positive numbers, into the procedure "proc-minus" dealing with the negative numbers and into the procedure "proc-error" executed in case of detecting the error in the expression method according to the content of the sign digital. The multiway branch function to execute the above procedures is shown as follows.

if SIGN<1001$b$ then proc-error; /* Checking the justification of the sign digit */ if sign=XXX0$b$ then proc-plus /* Basic check on the positive numbers */ if SIGN=1111$b$ then proc-plus; /* Exceptional check on the positive numbers.*/ proc-minus:

... /* processing of the negative numbers */ proc-plus:

... /* Processing of the positive numbers */ where SIGN indicates the content of the sign digit.

Taking the above statement as in high-level language into the expression in the microprogram, the mean number of the execution steps prior to the content of the microprogram and each procedure (proc-error, proc-plus and proc-minus) increases because the above statement may be expanded into the steps several times as many as the original steps.

The above-mentioned process on the sign digit is the pre-edit which has to be necessarilly executed in case of calculating the BCD. The execution time for the above process is necessarily reflected in the execution time for BCD operation. In case that high capacity is required for the BCD operation, the execution time for processing the sign digit is a dominant factor in improving the capacity.

Moreover, it is necessary to check the justification of the numerical digit prior to starting the BCD operation. As mentioned above, the values 0000 to 1001 are correct and the values 1010 to 1111 are incorrect and are to be detected as errors. The numerical digit is stored being divided into upper four bits and lower four bits of each bite data. In checking the justification of each digit, it is thus necessary to adjust the digit of the LSB position according to whether the digit is in the even position or in the odd position.

The above process is the pre-edit which has to be executed in case of BCD operation as well as the process of the sign digit. The execution time for the pre-edit is reflected highly in the whole execution time.

SUMMARY OF THE INVENTION

Accordingly, it is an object of the present invention to provide a microprogram control unit which has dissolved some of the above mentioned drawbacks in the microprogram control unit of the prior art.

Another object of the present invention is to provide a microprogram control unit which can be operated at a high speed.

A further object of the present invention to provide a program control unit with which a plurality of the states can be checked by the only one conditional branch micro-instruction.

A further object of the present invention is to provide a micro-instruction control unit which can rapidly carry out a branch operation with a short length of instruction.

Still another object of the present invention is to provide such a micro-instruction control circuit which can execute a multiway branch with an instruction of a short word length and at a high speed.

The above and other objects of the present invention are achieved in accordance with the present invention by a microprogram control unit for processing conditional branch micro-instructions stored in a micro-instruction memory to control the function of an information processing apparatus, comprising a microprogram counter coupled to the micro-instruction memory and containing address for accessing the micro-instruction stored in the memory;

a unit for registering the micro-instruction received from the micro-instruction memory and having an address field coupled to the microprogram counter and a condition field for designating a condition to be judged;

a detecting means coupled to the registering means to receive the micro-instruction therefrom and for detecting the conditional branch micro-instruction;

means for generating status signals representing respectively a plurality of the status of the information processing apparatus and selectively outputting anyone of the status signals; and a unit for judging the coincidence between the status signal selectively outputted from the status signal generating unit and the condition designated by the content of the condition field of the micro-instruction registered by the registering unit to output a branch control signal;

whereby the address field of the micro-program counter may be replaced by the content of the address field of the micro-instruction in accordance with the branch control signal.

According to another aspect of the present invention there is provided a microprogram control unit which includes a micro-instruction address register, comprising a first unit for latching at least a portion of a data, a second unit for extracting a portion of the data latched in the first unit, a third unit for selectively masking a portion of the data extracted by the second unit and replacing a portion of the content of the address register by the partially mask data.

BRIEF DESCRIPTION OF THE ACCOMPANYING DRAWINGS

Figure 11:
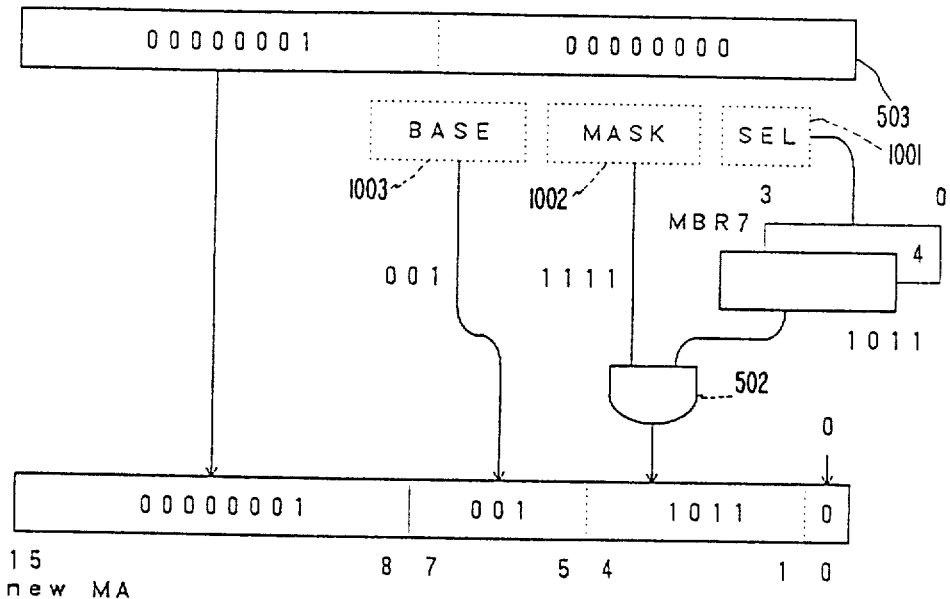
Figure 8:
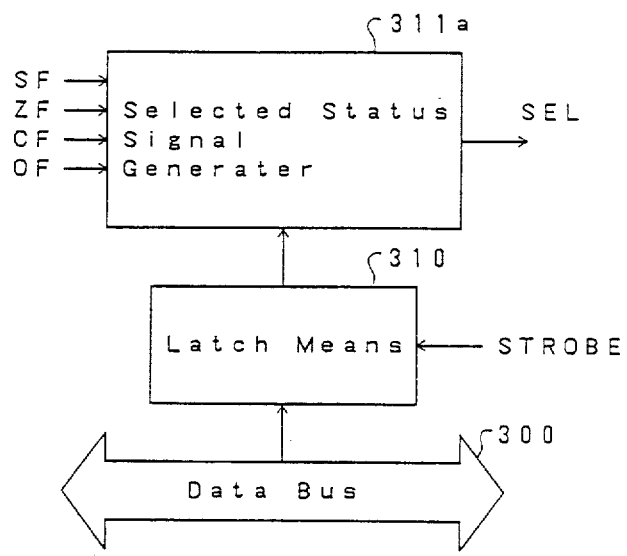
Figure 9:
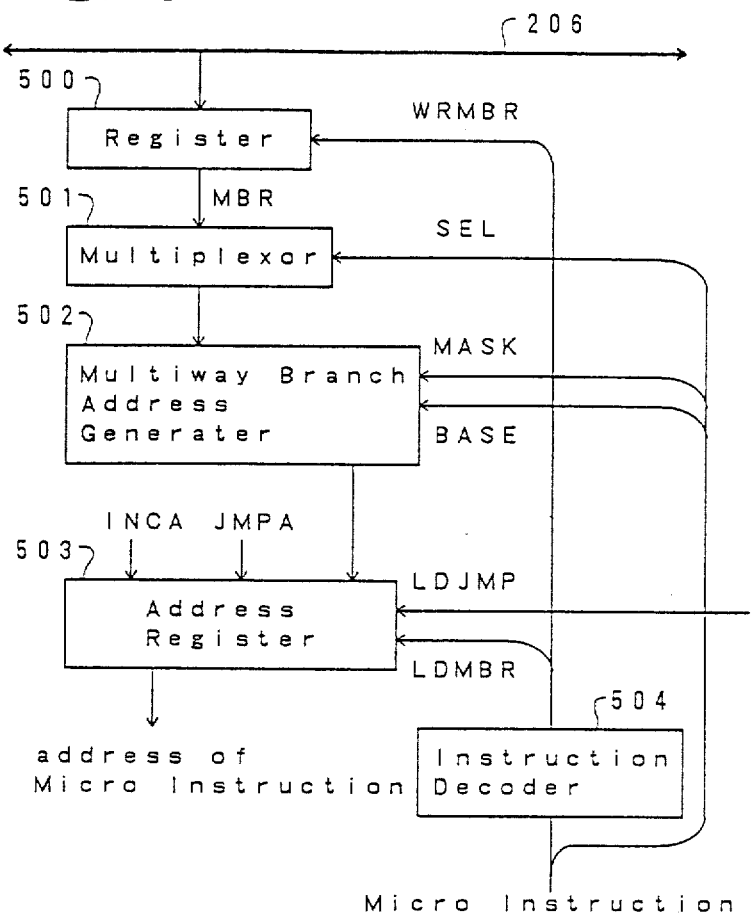
Figure 10:
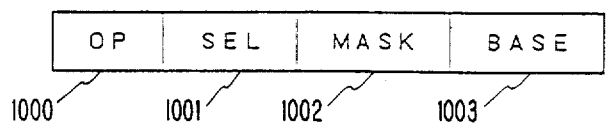
Figure 12:
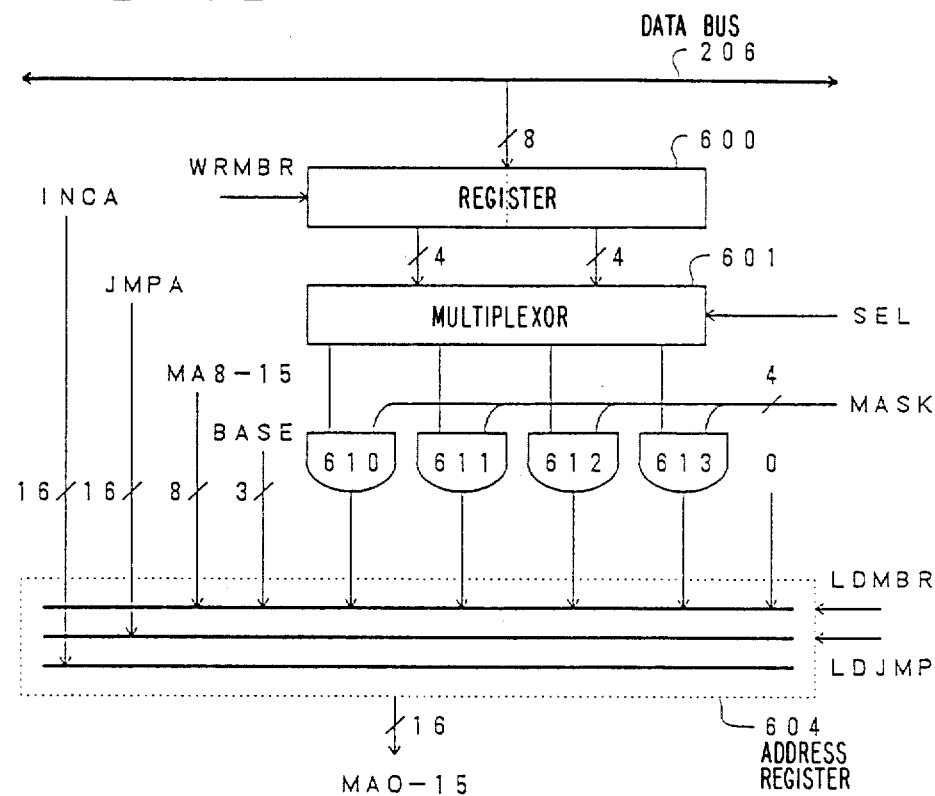
Figure 13:
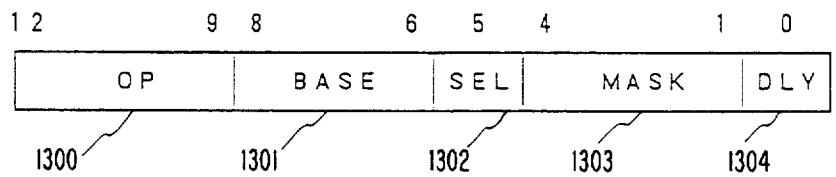
Figure 14:
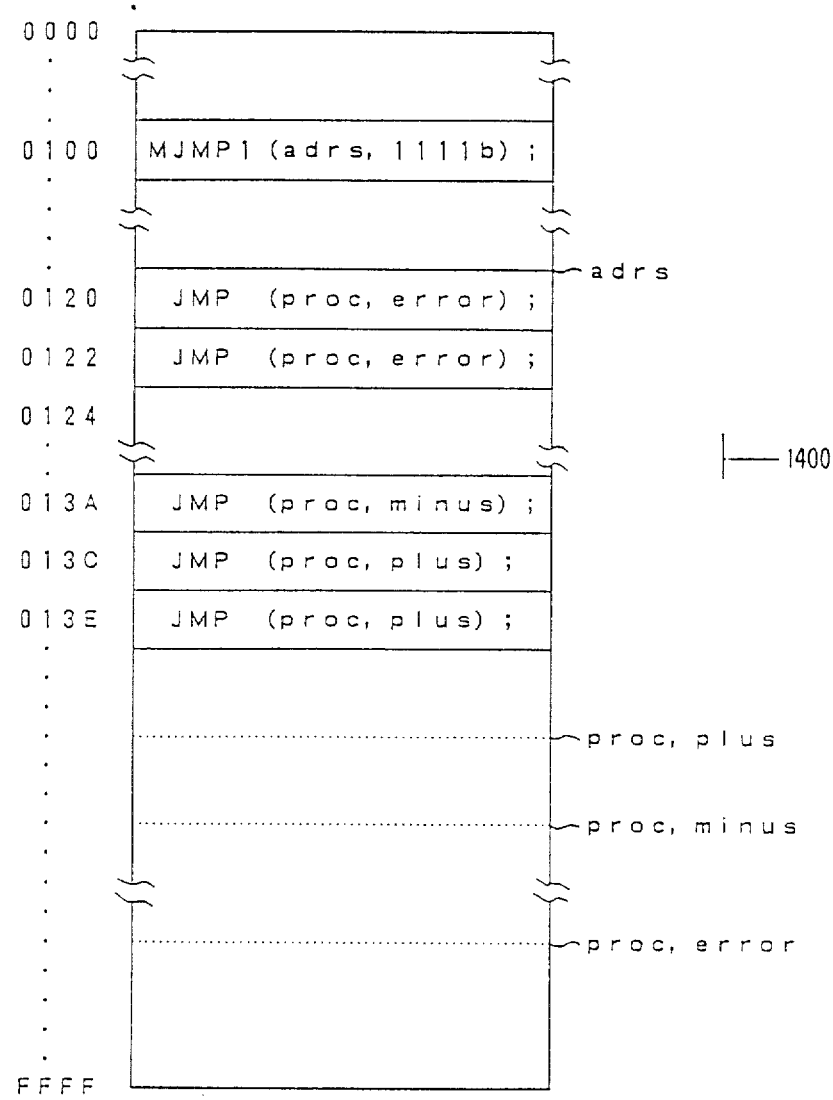
Figure 15:
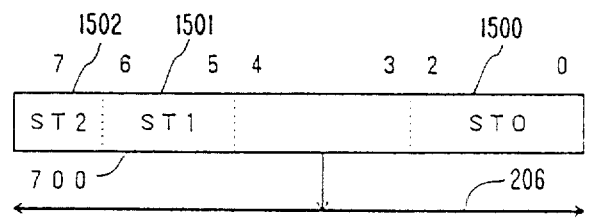

FIG. 8 partially shows another embodiment of the microprogram control unit of the present invention;

FIG. 9 is a block diagram of the essential part of the microprogram control unit according to the present invention, which processes multibranch micro-instructions;

FIG. 10 illustrates one example of the conventional format of a multibranch micro-instruction;

FIG. 11 illustrates the data treatment executed in the microprogram control unit in accordance with the present invention;

FIG. 12 is a circuit diagram of the microprogram control unit in accordance with the present invention;

FIG. 13 illustrates an example of the format of a multibranch micro-instruction used in the microprogram control unit in accordance with the present invention;

FIG. 14 illustrates an example of the procedure location relation in the BCD code information processing; and FIG. 15 illustrates the format of the status register used in another embodiment.

DESCRIPTION OF THE PREFERRED EMBODIMENTS

Figure 5:
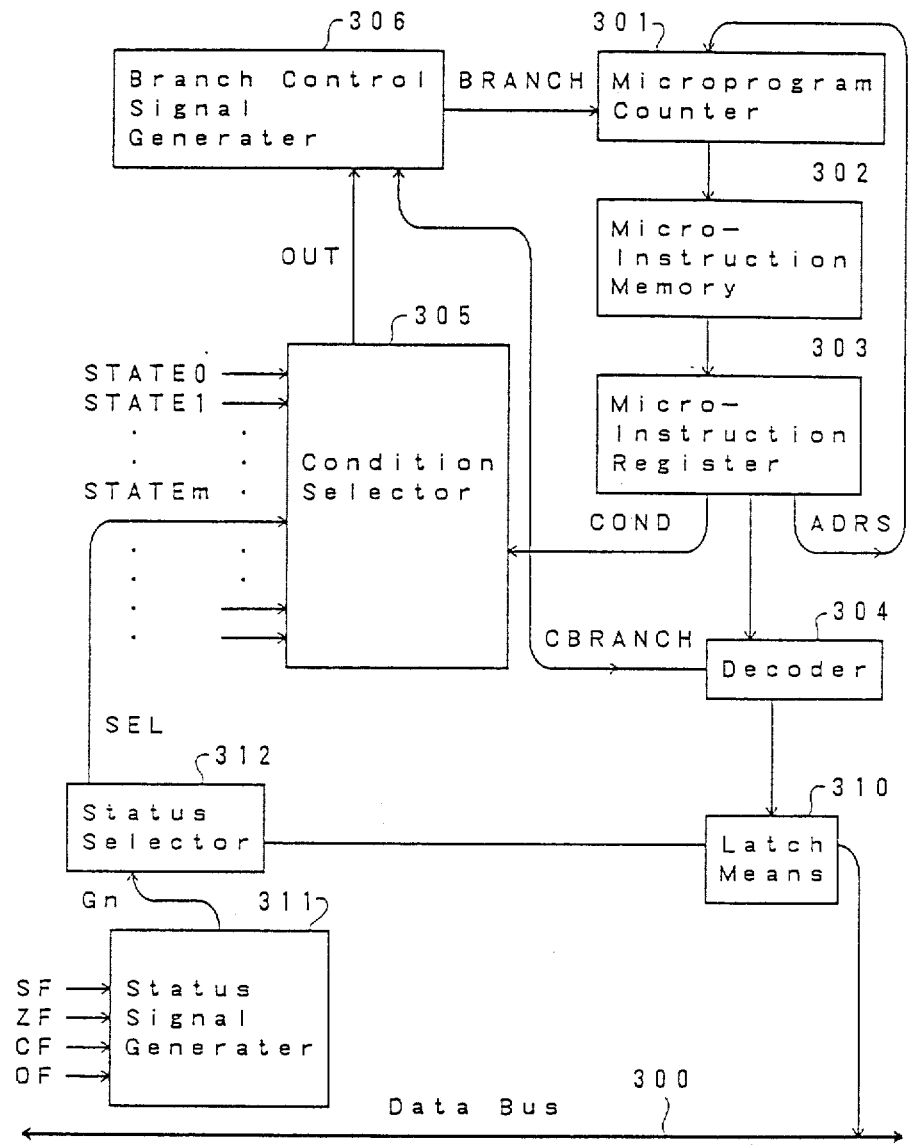
FIG. 5 is a block diagram of a microprogram control unit according to an embodiment of the present invention.

FIG. 5 shows a block diagram of the microprogram control unit according to an embodiment of the present invention. The microprogram control unit includes a microprogram counter 301 which contains the address information for accessing the micro-instruction to be executed and which, after the execution of the non-branched instruction, normally increments one memory address at a time for obtaining the program sequence from sequential memory locations. The microprogram counter 301 is coupled to a micro-instruction memory or multiplexor 302 from which the micro-instruction having an address corresponding to the content of the microprogram counter 301 is outputted.

The microprogram control unit further includes a register 303 for latching the outputted micro-instructions, and a decoder 304 for decoding the micro-instruction outputted from the register 303.

Figure 1:
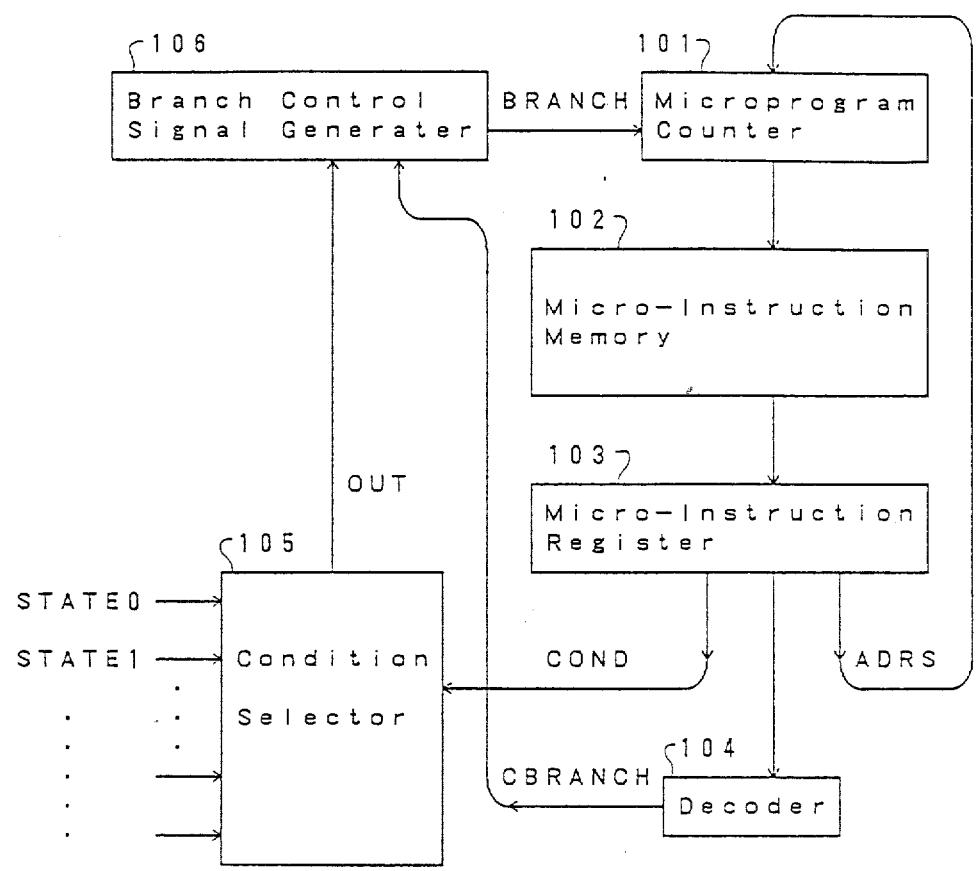
FIG. 1 is a block diagram of a microprogram control unit of the prior art.
Figure 2:
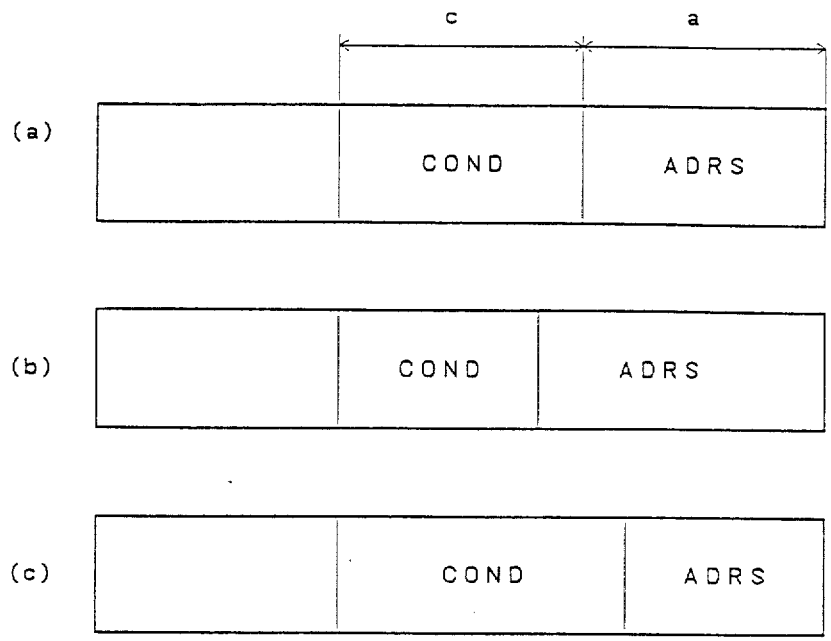
FIG. 2 shows a format of a conditional branch micro-instruction to be processed by means of the control unit shown in FIG. 1.

As described with reference to FIG. 2, the micro-instruction is composed of a condition field and an address field. The content of the address field of the micro-instruction latched in the micro-instruction register 303 is outputted to the microprogram counter 301 for resetting the address field thereby in accordance with a branch control signal BRANCH.

For generating the branch control signal BRANCH, the microprogram control unit includes a circuit 311 for generating the status signal. The circuit 311 may be coupled to, for example, to an arithmetic and logic unit which is not shown in FIG. 5 for simplifying the drawing and clearly representing the characteristics of the present invention.

In the present example where the relation between two binary numbers is to be judged, flag signals SF, ZF, CF and OF are inputted to the status signal generating circuit 311. The status signal generating circuit 311 generates, from these four signals, status signals $G_0$ to $G_{15}$ in accordance with the logic shown in Table 1. These status signals $G_0$ to $G_{15}$ designate, respectively, the status of the information processing apparatus after the execution of subtraction of two binary numbers.

TABLE I

| Status signal | Logic | Note |
|---|---|---|
| G0 | (not(SF) + OF)*(SF + not(OF))*not(ZF) | Id > Is |
| G1 | (not(SF) + OF)*(SF + not(OF)) | Id ≧ Is |
| G2 | ZF | Id = Is, Ud = Us |
| G3 | SF*not(OF) + not(SF)*OF + ZF | Id ≦ Is |
| G4 | SF*not(OF) + not(SF)*OF | Id < Is |
| G5 | not(ZF) | Id ≠ Is, Ud ≠ Us |
| G6 | not(CF)*not(ZF) | Ud > Us |
| G7 | not(CF) | Ud ≧ Us |
| G8 | OF + ZF | Ud ≦ Us |
| G9 | OF | Ud < Us |
| G10 | OF | |
| G11 | not(OF) | |
| G12 | SF | |
| G13 | not(SF) | |
| G14 | 0 | |
| G15 | 1 | |

The microprogram control unit further includes a latch means 310 which receives a signal STROBE from the micro-instruction decoder 304 when the decoder 304 detects a conditional branch micro-instruction, and is coupled to a data bus 300. The latch means 310 latches a transfer instruction from the data bus 300 in accordance with the signal STROBE to output a selection signal to a status selector 312. In more detail, the latch means 310 latches the lower four bits of the data presenting on the data bus 300.

A status selector 312, which is composed of a multiplexor, is coupled with the status signal generating circuit 311 for receiving the status signals Gn therefrom and selects a status signal in accordance with the selection signal outputted from the latch means 310. The selecting operation by the status selector 312 is illustrated in Table II.

TABLE II

| Selection Signal | Output Signal |
|---|---|
| 0000 | G11 |
| 0001 | G10 |
| 0010 | G9 |
| 0011 | G7 |
| 0100 | G2 |
| 0101 | G5 |
| 0110 | G8 |
| 0111 | G6 |
| 1000 | G12 |
| 1001 | G13 |
| 1010 | G14 |
| 1011 | G15 |
| 1100 | G1 |
| 1101 | G4 |
| 1110 | G0 |
| 1111 | G3 |

Thus, the status selector 312 selectively outputs a selected status signal SEL to a condition selector 305 which also receives the content COND m in the condition field of the micro-instruction outputted from the register 303. The condition selector 305 compares the selected status signal SEL with the content COND m of the condition field of the micro-instruction.

The microprogram control unit further includes a circuit 306 for generating a branch control signal BRANCH. The branch control signal generating circuit 306 receives a detection signal C BRANCH from the decoder 304 and the condition signal from the condition selector 305 so as to generate the branch control signal BRANCH. The branch control signal generating circuit 306 outputs the branch control signal BRANCH to the microprogram counter 301 when the condition signal is true. The microprogram counter 301 receives also the content ADRS of the address field of the micro-instruction from the micro-instruction register 303 when the branch control signal is active. Thus, the microprogram counter 301 replaces the address field with the addrress signal ADRS in accordance with the branch control signal BRANCH.

The operation of the microprogram control unit shown in FIG. 5 will be explained, in which the result of the substraction of two signed binary numbers A (0012h) and B (0034h) is judged.

The flag signals SF, ZF, CF and OF are obtained from the calculation as follows:
binary number A: 0012
binary number B: 0034
status of the flag signals after the subtraction:
SF=1, ZR=0, CF=1, OF=1

When it is ordered to check whether A is larger than B, the transfer micro-instruction orders that the latch means 310 latches a transfer signal (1100b) from the data bus 300. Then, the status selector 312 receives and decodes the transfer signal (1100b) from the latch means 310. The status signal generating circuit 111 generates 16 kinds of status signals from the flag signals SF, ZF, CF and OF, as shown in Table III.

TABLE III

| Status Signal | Output |
|---|---|
| G0 | 0 |
| G1 | 0 |
| G2 | 0 |
| G3 | 0 |
| G4 | 0 |
| G5 | 1 |
| G6 | 0 |
| G7 | 0 |
| G8 | 1 |
| G9 | 1 |
| G10 | 1 |
| G11 | 0 |
| G12 | 1 |
| G13 | 0 |
| G14 | 0 |
| G15 | 1 |

As shown in Table II, with the transfer signal (1100b), the status selector 312 selects the status signal $G_1$ and outputs the same as a selected status signal SEL to the condition selector 305. In this case, if A is larger than B, the status signal $G_1$ is "0" and therefore the selected status signal SEL becomes "0". Accordingly, when the selected status signal SEL is "0", the condition designated by the micro-instruction corresponds to the result of the calculation.

When the selected status signal SEL is "1", the condition designated by the micro-instruction does not satisfy the status after the calculation. Thus, when the condition signal COND from the micro-instruction becomes m, the branch control signal generating circuit 306 does not generate the branch control signal BRANCH, so that the branch operation is not conducted and the microprogram counter 301 increments the content of its address field by "1". Thus, the microprogram counter 301 outputs the next address signal (M+1) to access to the portion of the memory 302 where the next conditional branch micro-instruction is stored.

When it is required to check that A is not equal to B, a transfer micro-instruction 5 (0101b) is ordered so that it is latched by the latch means 310 from the data bus 100. In the present example, the status signal $G_5$, which indicates that A is not equal to B, is "1". Thus the selected status signal SEL becomes "1".

When the condition field COND of the conditional branch micro-instruction becomes m, the condition satisfies the status after the calculation so that the branch control signal BRANCH is generated. Accordingly, the content x of the address field ADRS of the branch micro-instruction is loaded to the lower side portion of "a" bit length so that the address N ($N$=int ($M/S$ $a*2$ $a$)+x) is loaded to the address field of the microprogram counter.

As explained hereinbefore, different conditions can be checked only by one conditional branch micro-instruction in accordance with the present invention.

Figure 6:
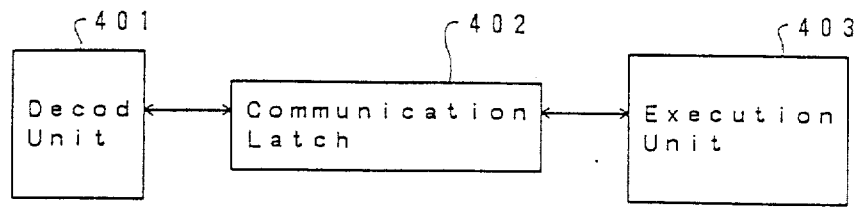
FIG. 6 shows an architecture of an information processing apparatus according to an embodiment of the present invention.

Referring to FIG. 6, an embodiment of the present invention will be explained. FIG. 6 is a block diagram of an example where a conditional branch instruction, which is visible to the user, (which will be referred to as "macro-instruction" in order to distinguish the same from the micro-instruction) is processed. As shown in FIG. 6, there is mounted a communication register 402 to which a decoder unit 401 and an execution unit 403 are coupled, so that communication may be conducted between the units 401 and 403. The communication register 402 receives the decoded information from the decoder unit 401 and transfers the same to the execution unit 403 for executing the microprogram therein.

Figure 7:
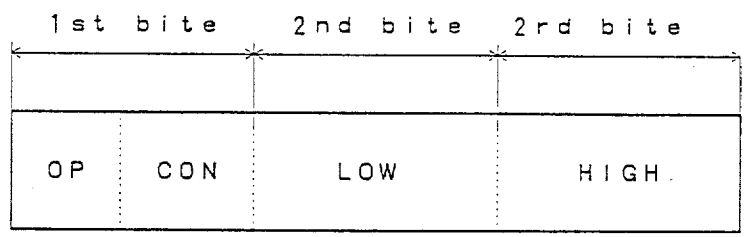
FIG. 7 is a format of a conditional branch macro-instruction.

In the present example, the macro-instruction has an instruction format as shown in FIG. 7. That is, the macro-instruction is composed of the most significant bite or the first bite consisting of an operand OP and a condition field CON, the second and the third bites containing respectively the lower and higher codes of the branch address designated by the macro-instruction.

When the decoder unit 401 fetches the conditional branch macro-instruction and decodes the same, the communication register 402 latches the decoded content z of the condition field CON (four bits) of the conditional branch macro-instruction.

In accordance with the present invention, the relation between the selection signal inputted to the status selector 312 (that is, the output signal of the status selecting latch means 310) and the status signal $G_0$ to $G_{15}$ is adjusted to correspond to the condition field of the conditional branch macro-instruction. Accordingly, it is not necessary to prepare a microprogram for each conditional branch macro-instruction. Thus, all of the conditional branch macro-instructions can be treated by only one microprogram.

The conditional branch macro-instruction is treated in the execution unit 403 as follows:

(1) In accordance with a transfer micro-instruction, the content z stored in the communication register 402 is transferred to the status selecting latch means 310.

(2) The selected status signal STATE n is checked by the conditional branch micro-instruction of which the content of the conditional field COND is n.

(3) If the selected status signal SEL is "1", the branch control signal is generated. The macro-instruction requires the branch operation so that the control is transferred to the branch routine.

(4) If the selected status signal is "1", the branch control signal is not generated. The macro-instruction does not require the branch operation so that the execution unit 403 finishes the operation corresponding to the conditional branch macro-instruction.

In the macroprogram control unit of the prior art, the steps (2) and (3) are executed for each condition designated by the macro-instruction. In accordance with the present invention, however, only one microprogram is necessary regardless of the number of conditions (in the present example, the number of conditions is 16).

Now, referring to FIG. 8, another embodiment of the present invention will be explained, wherein the status signal generating circuit 311 and the status selector 312 shown in FIG. 5 are united to a circuit 311a for generating a selected status signal.

As shown in FIG. 8, the latch means 310 for registering the transfer instruction is coupled directly to a circuit 311a for generating the selected status signal SEL. The circuit 311a generates the signal SEL according to the logic as shown in Table IV.

TABLE IV

| | |
|---|---|
| [nnnn=0000b] | and OF or |
| [nnnn=0001b] | and not (OF) or |
| [nnnn=0X10b] | and CF or |
| [nnnn=0011b] | and not (CF) or |
| [nnnn=01X0b] | and ZF or |
| [nnnn=0101b] | and not (ZF) or |
| [nnnn=0111b] | and not (CF) and not (ZF) or |
| [nnnn=1000b] | and SF |
| [nnnn=1001b] | and not (SF) or |
| [nnnn=1010b] | and 0 |
| [nnnn=1011b] | and 1 |
| [nnnn=11X0b] | and SF and not (OF) or |
| [nnnn=11X0b] | and not (SF) and OF or |
| [nnnn=1110b] | and ZF or |
| [nnnn=1101b] | and not (SF) and not (OF) or |
| [nnnn=1101b] | and SF and OF |
| [nnnn=1111b] | and not (SF) and not (ZF) and not (OF) or |
| [nnnn=1111b] | and SF and not (ZF) and OF |

The combination logic shown in Table IV is a logical sum of 18 items of logical multiplies. A circuit for such a combination logic may be obtained by means of programmable logic array (PLA) which has been well known in the art. By using the PLA, the circuit can be highly simplified and the layout of the integrated circuit for the microprogram control unit becomes very simple.

Figure 3:
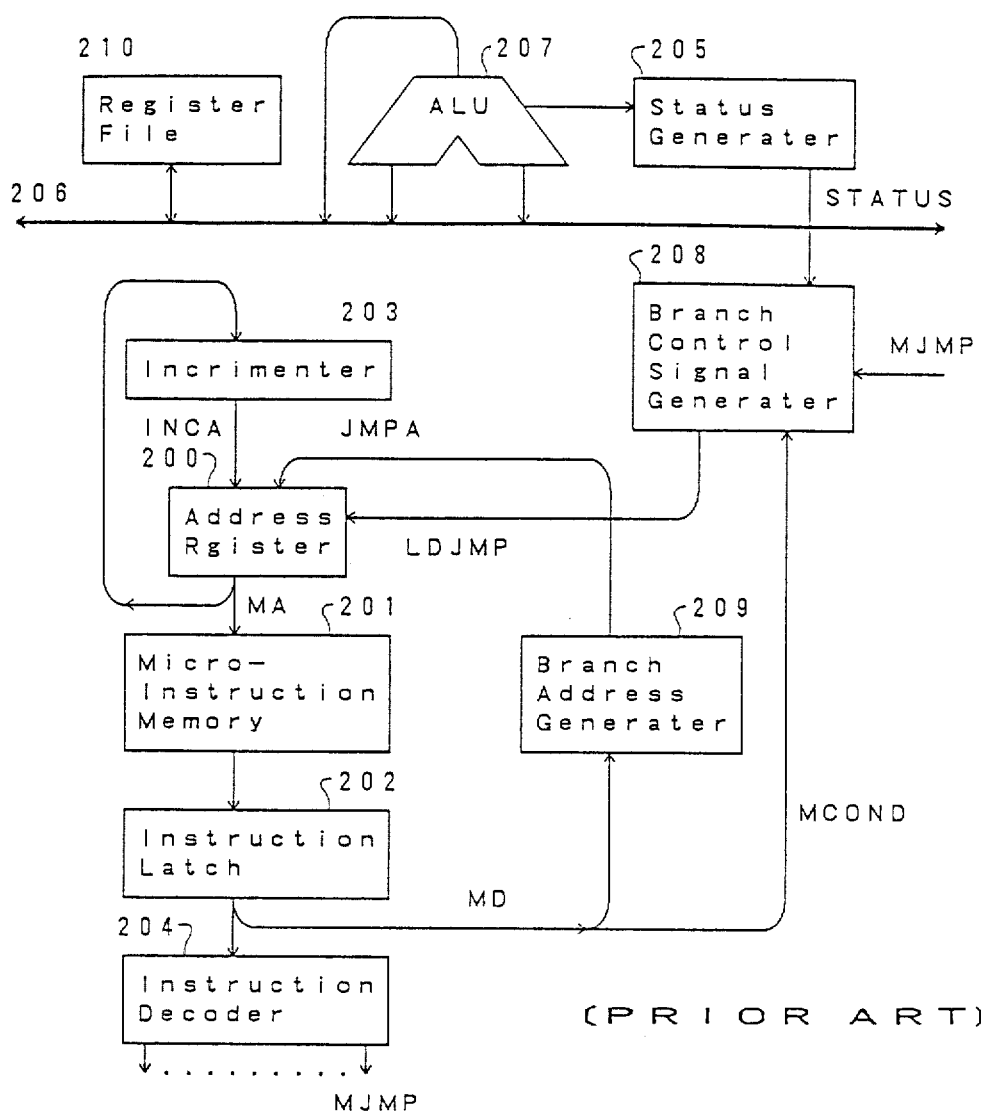
FIG. 3 is a block diagram of a microprogram control unit for processing multibranch micro-instructions according to the prior art.
Figure 4:
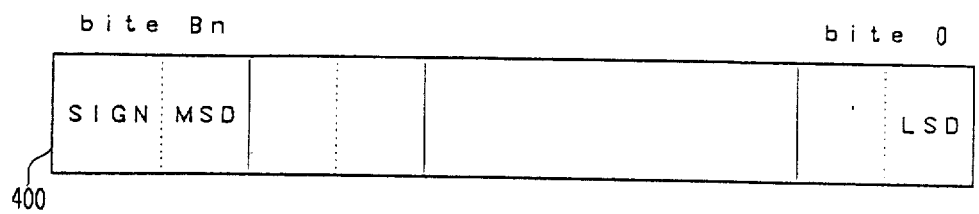
FIG. 4 shows a format of a multibranch micro-instruction to be processed by means of the control unit shown in FIG. 3.
Figure 4:
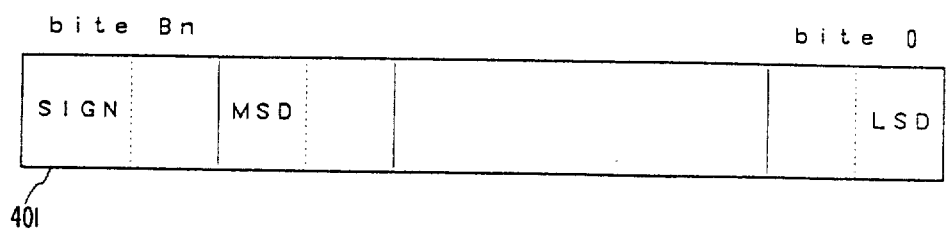

Referring to FIG. 9, there is shown another embodiment of the microprogram control unit in accordance with the present invention. The microprogram control unit of the present embodiment is to improve the one of the prior art which has been explained with reference to FIG. 3, and is for processing multibranch micro-instructions. The shown unit includes an address register 503 adapted to latch the address for accessing a microinstruction to be executed at the next time in the case that the microprograms are executed in the sequence generated by the incrementor 203. Further, in response to the signal LDTMP the address register 503 latches the address of the branch target generated by the branch address generator 209 when an unconditional or conditional branch micro-instruction is executed. Also, in response to the signal LDJMP the register 503 latches the address of the branch target generated by a multiway branch address generator 502 when a multi-branch micro-instruction is executed.

The shown unit includes a multiway branch register 500 coupled to the data bus 206 so as to latch the whole or a portion of the content on the data bus 206 when the latch signal WRMBR is generated. The branch register 500 is coupled to a multiplexor 501 which operates to selectively output the content MBR of the multiway branch register 500 in accordance with the value of the selection field "SEL" of the multibranch micro-instruction. The output of the multiplexor 501 is inputted to the multiway branch address generator 502 together with the mask field MASK and the base field BASE of the multibranch micro-instruction. The generator 502 operates to output the address of the branch target determined by the above three inputs.

An instruction decoder 604 receives the micro-instruction MD and generates microorders such as the signal WRMBR indicating that the transfer micro-instruction designates the transfer to the multiway branch register 500, and the signal LDMBR showing that the multibranch micro-instruction is executed.

FIG. 10 illustrates one example of the multibranch instruction, which comprises an operation field OP 1000 including the operation code of the multibranch micro-instruction. The shown instruction also has a selection field "SEL" 1001 for selecting the data to be coupled to the multiway branch address generator 502, from the content of the multiway branch register 500. Further, a mask 1002 field MASK of the multibranch instruction designates the validity of the bit correspondence to the field of the multiway branch register 500 selected by the selection field SEL, and a field BASE 1003 indicates the base address of the branch address.

Next, operation of the above mentioned device will be explained in detail.

The data "params" composed of M b-bit parameters Nm is latched in the multiway branch register 500 in response to the latch signal WRMBR generated by the instruction decoder 504 when the transfer micro-instruction is executed. When the multibranch micro-instruction is latched in the instruction latch 202 (FIG. 3), the instruction decoder 504 generates the microorder LDMBR. On the other hand, the memory 201 (FIG. 3) outputs the parameter Nsel designated by the selection field SEL of the multibranch micro-instruction. As a result, the multiway branch address generator 502 derives the logical product of the parameter Nsel and the mask field MASK, and combines n "O"s to the result of product so as to generate a less significant [b+z bits] of the branch address.

In this condition, the multibranch micro-instruction detection signal LOMBR is generated, the output of the address generator 502 is latched in the (b+z) less significant bits of the address register 503, and the base field BASE of the multibranch micro-instruction is latched the more significant bit portion of the register 503, so that the address of a new branch target is generated in the register 503.

In a specific condition, the above operation will be explained with reference to FIG. 11. Assume that the contents of the register 503 is "0000000100000000", and the data selected by the selection field SEL 1001 is "1011". In addition, it is assumed that b=4 and n=1. In this condition, if the mask 1002 field "1111" is supplied to the generator 502, the logical product of "1111" and "1011" is calculated in the generator 502, with the result that "1011" is outputted. Then, one bit of "0" is combined to the data "1011" in such a manner that the data "1011" is upwardly shifted one bit and the bit of "0" is put into the least significant bit. Namely, the less significant [b+z bits] "10110" is obtained. Thereafter, the base 1003 field "001" is coupled to the most significant bit side of the data "10110", so that "00110110" can be obtained.

The above mentioned operation is expressed by the following formula:

new-adrs=base*(2 $(b+z)$)-params (sel) and mask)*(s z);

where
"new-adrs" is the address of branch target
"Params(sel)" is the b-bit data of the multiway branch register 500 selected by the selection field SEL.

Turning to FIG. 12, there is shown the structure of the device in accordance with the present invention in more detailed form. An 8-bit register 600 is coupled to the data bus 206, and the 8-bit parameter latched in the register 600 is halved, so that a first 4 bit data and a second 4 bit data are connected to a multiplexor 601. Thus, one of the two 4-bit data is selected by the multiplexor 601 in accordance with the selection field SEL. Therefore, it is possible to branch in sixteen ways at maximum.

In this embodiment, the multibranch micro-instruction has the format of 13 bits, as shown in FIG. 13. Namely, the micro-instruction includes a 4-bit operation code field OP 1300, a 3-bit base address field BASE 1301, a 1-bit selection field SEL 1302, a 4-bit mask field MASK 1303 and a 1-bit field DLY 1304 which does not concern the present invention.

In this case, the multibranch micro-instruction is expressed as follows:
MJMPO (adrs, mask);
MJMPI (adrs, mask);

Both these micro-instructions are common to each other, excepting that the MJMPO puts "0" in the selection field SEL and the MJMPI puts "1" in the selection field SEL. In the item of "adrs", the head address of 16 different multibranch targets is described, but it is subjected to the following limitations:

$MA \div (2 \quad 8) = adrs \div (2 \quad 8)$   limitation 1

$adrs \mod (2 \quad 5) = 0$   limitation 2 where ÷ is an operator for division of integers

These limitations define that the head address of the multibranch target is positioned on the head of 32 word boundaries and the address of the branch target is the same as that of the current address describing the multibranch micro-instructions, the more significant 8 bits. These limitations are not inconvenient at all to the microprograms if the micro-instruction memory have a sufficiently large address space.

The relation between "adrs" and the base address field "base" is given by the following equation:
base=(adrs÷(2 5))mod(2 3);

The micro-instruction memory 201 (FIG. 3) includes a 16-bit address space for storing the address MA0-15 of the micro-instruction which should be executed at the next time by an address register 604.

Returning to FIG. 12, the 4-bit output of the multiplexor 601 is connected through an array of two-input AND gates 610-613 to the address register 604. Each of the AND gates is connected at its one end to each bit output of the multiplexor 601, and at its other end to receive a corresponding bit of the field MASK.

Specifically, in response to the signal LDMBR indicating that the multibranch micro-instruction has been decoded, the address register 604 latches at its more significant 8 bits the more signficant 8 bits of the multibranch micro-instruction. Further, the address register 604 latches at its succeeding less significant 3 bits the base address field BASE of the multibranch microinstruction, and at its further less significant 4 bits the output of the four AND gates 603. In addition, one bit of logic value "0" is latched to the least significant bit of the register 604.

The 8-bit register 600 is coupled to the least significant 8 bits of the data bus 206, and latches the 8-bits of the data bus 206 when the latch signal WRMBR is rendered active. The 4-bit multiplexor 601 operates to selectively output the least significant 4 bits of the 8-bit register 600 when the selection field SEL of the multibranch micro-instruction is "0". On the other hand, when the selection field SEL is "1", the multiplexor 601 outputs the most significant 4 bits of the resistor 600.

The output of the 4-bit multiplexor 601 and the mask field MASK of the multibranch micro-instruction are inputted to the array of two-input AND gates 603, and the logical product of 4 bits is latched to an intermediate significant 4 bits of the address register 604.

Next, operation of the device shown in FIG. 12 will be explained in the case of BCD data processing. Assume that the data "10111100b" (OBFh) is set in the 8-bit register 600 as the result of the execution of the transfer micro-instruction. In this condition, when the multibranch micro-instruction MJMPI (proc-base, 1111b) at the address "0100" is executed, the microorder LDMBR is rendered active. At this time, the respective fields of the multibranch micro-instructions are set:
SEL: 1b
BASE: 001b
MASK: 1111b Since the current value of the address register 604 is "0000000100000000b", the most significant 8 bits of the updated content of the address register are still "00000001b". The succeeding three bits are set with the base field value "001b", and the next four bits are set with the output of the AND gate array. Since the selection field SEL is "1" as mentioned above, the most significant 4-bit data "1011b" of the 8-bit register 600 are inputted into the AND gate array together with the mask field value "1111b". The resultant logical product "1011b" is set to the above 4-bit place of the address register 604. The least significant one bit of register 603 is ceaselessly set with "0".

As a result, the address register 604 is set with "000000001001101110b" i.e., the address number 0136.

Similarly, the following addresses, that is, the execution results of the multibranch micro-instruction MJPI (proc-base, 1111b) can be obtained according to the value of the most significant 4 bit data "n" in the 8-bit register.

| n (binary) | address (hexadecimal) |
|---|---|
| 0000 | 0120 |
| 0001 | 0122 |
| 0010 | 0124 |
| : | : |
| : | : |
| : | : |
| 1110 | 013C |
| 1111 | 013E |

In these branch addresses, there are described branch micro-instructions JMP to the procedure "proc-plus" for processing the positive numbers; JMP to the procedure "proc-minus" for processing the negative numbers; and JMP to the procedure "proc-error" for executing the error processing. On completion of execution of the multibranch micro-instruction, the control is shifted to one of those procedures.

FIG. 14 illustrates the relationship 1400 between such procedures and the location of the micro-instruction.

| procedure | process | address |
|---|---|---|
| proc-plus | positive numbers | 0134, 0138, 0130, 013E |
| proc-minus | negative numbers | 0136, 013A |
| proc-error | errors | 0120, 0122, 0124, 0126 |
|  |  | 0128, 012A, 012C, 012E, |
|  |  | 0130, 0132 |

In the above operation, after the control is shifted to the address 0136, the control is shifted to the procedure for processing the negative nembers descripted in "proc-minus" by the execution of the JMP (proc-minus) instruction.

Similarly, in the case that the most significant 4 bits 1110b in the 8-bit register 600 is set, the control is shifted to "proc-plus" through the address 013C so that the procedure for processing the positive numbers can be started. If the data "0010b" is set, the procedure for executing the error processing can be started since the control is shifted to "proc-error" through the address 0128.

An explanation will be made on another operation of the present apparatus. In the present operation mode, the value of the 8-bit status is to be set up in the 8-bit egister 700, as shown in FIG. 15, by executing a transfer micro-instruction. Each bit in the status register 700 is devided into the three fields such as STO 1500 (3 bits), ST1 1501 (2 bits) and ST2 1502 (1 bit) and located at the bit 0 to 2, bit 5 and 6, and bit 7 in the status register, respectively. The bits 3 and 4 in the status register 700 are not defined and are unfixed.

The following instructions are used so as to check each field.

| field | multibranch micro-instruction | branch address |
|---|---|---|
| ST0 | MJMP0 (adrs 0, 0111b); | 0, 2, 4, 6, 8 |
|  |  | 0A, 0C, 0E |
|  |  | (+ adrs 0) |
| ST1 | MJMP1 (adrs 1, 0110b); | 4, 8, 0C, 0E |
|  |  | (+ adrs 1) |
| ST2 | MJMP1 (adrs 2, 1000b); | 0, 8 |
|  |  | (+ adrs 2) |

In case of checking the field ST1, control can be shifted, for example, to address number 4 if the content of ST1 is 00b, to the address number 8 if the content is 01b, to the address number 0C if the content is 10b and to the address number 0E if the content is the address 11b (base address adrs 1 is added respectively).

In the embodiment of the present invention above described, it is possible to select 2, 4, 8, 16 ways as the maximum choice in 16 ways having the 8-bit parameter divided into two. Moreover, the present invention can provide multibranch micro-instructions with high multiplicity being composed of short micro-instructions. After elongating the length of the multiway branch register 600 and the length of the field SEL for selecting the parameter of the multiway branch micro-instruction, such shorter micro-instructions are obtained by multi-dividing the longer parameter.

As described hereinabove, in the microprogram where it is necessary to change the procedure according to the parametter, the present invention provides micro-instructions which are very comprehensive, short in the instruction word length and can execute the rapid branch operation without reference to the length and value of the parameter.

I claim:

1. A microprogram control system for processing conditional branch micro-instructions stored in a micro-instruction memory to control an information processing apparatus, comprising;
    a microprogram counter coupled to the micro-instruction memory and storing addresses for accessing micro-instructions stored in the micro-instruction memory;
    means for registering a micro-instruction received from the micro-instruction memory and having an address field coupled to the microprogram counter and a condition field for designating a condition to be compared;
    detecting means coupled to the registering means for receiving the micro-instruction therefrom and for detecting conditional branch micro-instruction and generating a detection signal thereupon;
    status latch means coupled to a data bus and responsive to the detection signal from the detecting means to latch a condition code portion of data on the data bus;
    means receiving a plurality of items of status information for generating status signals which are of a number larger than that of the items of status information and are representative of a plurality of status of the information processing apparatus, respectively, and outputting one status signal selected from the status signals; and
    means for judging coincidence between the status signal selectively outputted from the status signal generating means and the condition designated by the content of the condition field of the micro-instruction registered by the registering means and for outputting a branch control signal thereupon;
    whereby, when the detecting means detects reception of the conditional branch micro-instruction and generates the detection signal, a transfer micro-instruction is firstly executed so that a condition code in the conditional branch micro-instruction is transferred to the data bus and then latched in the latch means, one of the status signals generated by the status signal generating means is selected on the basis of the condition code latched in the latch means, the conditional branch micro-instruction is executed thereafter so that the status signal selected and outputted by the status signal generating means on the basis of the condition code contained in the conditional branch micro-instruction is compared with the condition field of the register means by the judging means so that the judging means generates the branch control signal if a branch condition is fulfilled, and at least a portion of a content of the micro-program counter is replaced by an address data of the conditional branch micro-instruction in response to the branch control signal.

2. A system as claimed in claim 1 wherein the status signal generating means includes a status signal generator and a selecting means for outputting one status signal of the status signals selected in accordance with a selection signal generated by the latch means.

3. A system as claimed in claim 1, the judging means includes a condition selector for comparing the content of the condition field of the micro-instruction registered in the registering means with the selectively outputted status signal, and a circuit for generating a branch control signal in response to the output signal from the condition selector.

4. A system as claimed in claim 1, wherein the condition field of said micro-instruction is of a fixed bit length.

5. A microprogram control unit for processing conditional branch micro-instructions stored in a micro-instruction memory to control the function of an information processing apparatus, comprising:
    a microprogram counter coupled to the micro-instruction memory and storing addresses for accessing micro-instructions stored in the memory;
    means for registering a micro-instruction received from the micro-instruction memory and having an address field coupled to the microprogram counter and a condition field for designating a condition to be compared;
    detecting means coupled to the registering means to receive the micro-instruction therefrom and for detecting a conditional branch micro-instruction to generate a detection signal;
    status latch means coupled to a data bus and responsive to the detection signal from the detecting means to latch a condition code portion of data on the data bus;
    means receiving a plurality of items of status information for generating status signals which are of a number larger than that of the items of status information and are representative of a plurality of the status of the information processing apparatus, respectively, and outputting one selected from the status signals; and
    means for judging a coincidence between the status signal selectively outputted from the status signal generating means and the condition designated by the content of the condition field of the micro-instruction registered by the registering means to output a branch control signal;
    whereby, when a conditional macro-instruction is read as a macro-instruction to be executed, a transfer micro-instruction is first executed in response to the conditional macro-instruction, so that a condition code in the conditional macro-instruction is transferred to the data bus and then latched in the latch means, whereupon, one of the status signals generated by the status signal generating means is selected on the basis of the condition code latched in the latch means, and thereafter, a conditional micro-instruction is executed so that the status signal selected and outputted by the status signal generating means on the basis of the condition code contained in the conditional branch macro-instruction is compared with the condition field of a conditional micro-instruction registered in the register means by the judging means so that the judging means generates the branch control signal if a branch condition is fulfilled.

6. A system claimed in claim 5, wherein the microprogram counter is coupled to receive an address data of a micro-instruction registered in the register means and is controlled by the branch control signal, so that at least a portion of a content of the micro-program counter is replaced by the address data in the conditional microinstruction registered in the register means in response to the branch control signal.

7. A microprogram control system for a micro-program controlled data processor, comprising:

an instruction decoder coupled to receive a given micro-instruction for decoding the received micro-instruction so as to generate a multi-way branch register transfer signal and a multi-branch micro-instruction execution signal;

a multi-way branch register coupled to an internal data bus through which data for controlling internal circuits of the processor and for latching at least a portion of data on the internal data in response to the multi-way branch register transfer signal;

a multiplexer coupled to the multi-way branch register for extracting a portion of the data latched in the multi-way branch register in response to a selection field contained in the given micro-instruction;

a multi-way branch address generator coupled to receive an output of the multiplexer and a mask field and a base field contained in the given micro-instruction, the multi-way branch address generator selectively masking a portion of the data extracted by the multiplexer so as to generate a first branch destination address for a multi-way branch; and a micro-instruction address register coupled to receive a micro-instruction address generated by an address incrementer, the first branch destination address generated by the multi-way branch address generator and a second branch destination address generated by a branch address generator;

said micro-instruction address register responding to multi-branch micro-instruction execution signal to output the first branch destination address register operating to output the micro-instruction address generated by the address incrementer as a micro-instruction address when a micro-program is sequentially executed;

said micro-instruction address register operating to output the second branch destination address generated by the branch address generator as a micro-instruction address when a conditional or unconditional branch micro-instruction is executed.

8. A microprogram control system which includes a micro-instruction address register, comprising:

first means coupled to an internal data bus for latching at least a portion of data on the internal data bus in response to execution of a data transfer micro-instruction;

second means for extracting a portion of the data latched in the first means;

third means for selectively masking a portion of the data extracted by the second means and replacing a portion of a content of the micro-instruction address register by the selectively masked data; and fourth means for receiving a given micro-instruction and for generating a right signal to the first means thereupon, so that the first means latches the portion of the data; wherein said first means is a branch register coupled to a data bus and configured to latch a portion of the data on the data bus in response to the write signal from the fourth means;

said branch register is configured to latch a less significant bit portion of the data on the data bus;

said second means is a multiplexer coupled to the branch register and configured to select a portion of the data in the branch register in a given selection signal; and said third means is an address generator configured to receive the output of the multiplexer and a given mask signal so as to generate a logical product therebetween.

9. A system as claimed in claim 8 wherein the address generator operates to carry out a logical product between the given mask signal and a portion of the multiplexer output is masked.

10. A system as claimed in claim 9 wherein the address generator operates to further replace a portion of the partially masked output of the multiplexer by a base signal.

11. A system as claimed in claim 10 wherein the selection signal, the mask signal and the base signal are given by a micro-instruction.

* * * * *